United States Patent [19]

Vasilantone

[11] Patent Number: 5,711,192
[45] Date of Patent: Jan. 27, 1998

[54] INDEXER WITH IMPROVED CLUTCH

[76] Inventor: Michael Vasilantone, Humboldt Industrial Park, Hazleton, Pa. 18201

[21] Appl. No.: 474,012

[22] Filed: Jun. 7, 1995

[51] Int. Cl.⁶ .......................... B23Q 16/10; F16D 67/02
[52] U.S. Cl. .................. 74/827; 74/813 R; 74/122; 74/125.5; 192/18 R
[58] Field of Search .................... 74/125.5, 122, 74/120, 827, 822, 813 R; 192/18 R

[56] References Cited

U.S. PATENT DOCUMENTS

| | | | |
|---|---|---|---|
| 1,745,460 | 2/1930 | Sudhoff | 74/822 |
| 2,034,977 | 5/1960 | Wildhaber | 74/822 |
| 2,359,420 | 10/1944 | Herzog | 74/30 |
| 2,660,278 | 11/1953 | Landwier | 192/18 R |
| 2,708,861 | 5/1955 | Walter | 409/221 |
| 2,965,208 | 12/1960 | Forster et al. | 74/813 |
| 2,975,657 | 3/1960 | Samuel | 74/822 |
| 3,490,753 | 1/1970 | Frisch | 74/822 |
| 3,618,426 | 11/1971 | Fisher | 74/827 |
| 3,636,781 | 1/1972 | Elliott | 74/125.5 |
| 4,090,413 | 5/1978 | Vickland | 74/655 |
| 4,202,221 | 5/1980 | Thompson | 74/821 |
| 4,425,988 | 1/1984 | Stock et al. | 74/125.5 X |

FOREIGN PATENT DOCUMENTS

| | | | |
|---|---|---|---|
| 558118 | 5/1958 | Canada | 74/822 |
| 957930 | 5/1964 | United Kingdom | 74/813 |
| 2059542 | 4/1981 | United Kingdom | 74/822 |

*Primary Examiner*—Rodney H. Bonick
*Attorney, Agent, or Firm*—Fish & Richardson, P.C.

[57] ABSTRACT

An improved indexing device for generating a smooth and controlled rotary motion where double rotary cranks having slide members coupled to corresponding slide guides arranged in orientation parallel to the plane of rotation of the rotary cranks are provided. Each slide guide is attached to a trolley movable in a direction transverse to the axis of the slide guides. A linear gear rack is mounted on each trolley in parallel to its sliding motion and are opposingly configured across a rotary gear member. The gear member drives a positive locking clutch which is entirely self contained within the indexer assembly itself and requires no operator or external control. The clutch function is accomplished automatically when appropriate during the indexer cycle. During stationary periods, the output of the indexer is locked preventing movement of the indexer and providing unique stability to the device. The positive locking features of the clutch also provide for different indexer station numbers through a set of matched clutch disks and rotary crank arms. The rotary motion generated is especially smooth in that a first acceleration period of significance is effected at the beginning of the indexed rotary motion to reach a constant driving speed, and a second deceleration period of significance is effected at the end of such indexed rotary motion to come to a halt from the driving speed, producing a unique soft start and stop characteristic to provide smooth rotary motion.

5 Claims, 8 Drawing Sheets ary linear motion.
However, in such indexing assemblies, the rotary motion is uneven due to sudden acceleration and deceleration of intermediate linear elements. Precise positioning is sacrificed due to the rudimentary structures used to couple and decouple the drive mechanism from the rotary table. Units of the prior art are too bulky in structure for universal application and efficient integration with associated equipment.

INDEXER WITH IMPROVED CLUTCH

BACKGROUND AND FIELD OF THE INVENTION

This invention relates to an automatic indexing assembly for use with machines that require precisely controlled rotative start and stop movements. Rotary tables provide a convenient application for indexing assemblies that have a plurality of stations. Often, controlled rotary motion is generated via a form of reciprocating linear motion. However, in such indexing assemblies, the rotary motion is uneven due to sudden acceleration and deceleration of intermediate linear elements. Precise positioning is sacrificed due to the rudimentary structures used to couple and decouple the drive mechanism from the rotary table. Units of the prior art are too bulky in structure for universal application and efficient integration with associated equipment.

Rotary tables often require quick and accurate indexing and have until now, been somewhat limited to air cylinders, Geneva Drives and servo motors. Such devices are expensive and complex and they tend to dominate the equipment with which they are used. They must in general be specifically designed for each application and are not readily adaptable for use on other equipment. In addition, it is usually not possible to readily alter the configuration of such devices to accommodate different numbers of indexer stations.

Prior art indexer clutches typically take the form of a slipping belt and rotor or standard pad clutch mechanism. These clutches suffer from an inherent inability to precisely couple the drive mechanism to the indexer. As a consequence, prior art mechanisms must rely on operator control or other external control systems to ensure accurate positioning of the indexer. In addition, prior art clutches of the type mentioned are prone to failure and require a high level of maintenance. The frictional effects generated by prior art devices are disadvantageous to most precise positioning applications.

Further, in prior frictional clutch systems, the clutch elements had to be isolated from any source of lubrication in order to prevent slippage. This produced early obsolescence of the clutch mechanism and related components. Because prior art systems typically depend on continuous input motion which is related directly to the output, control of these systems was difficult, essentially requiring control elements to sense and process a moving target.

Still further, prior systems suffered from abrupt changes in output, velocity and acceleration. In order to accommodate an application requiring a more even input, it was necessary to decouple the drive mechanism from the output during such periods. Further, in such units precise positioning of the indexer output was sacrificed in order to soften the output.

Still further, prior systems relied on operator controlled, gravity or spring driven clutch mechanisms which did not create an automatic, definite, and positive interaction between the respective drive mechanisms and indexer outputs.

The aforementioned shortcomings of the prior art are by no means exhaustive; however, they demonstrate that indexing devices of the past have been less than completely satisfactory and room for significant improvement exists.

OBJECTIVES OF THE INVENTION

It is an objective of the instant invention to provide an indexing device for generating smooth controlled rotary motion with distinctive periods of acceleration, constant driving speed, and deceleration, and to precisely couple the drive mechanism to the indexer assembly through the use of an improved clutch.

It is another objective of the instant invention to provide an indexing device for generating smooth controlled rotary motion with distinctive periods of acceleration, constant driving speed, and deceleration in a wide range of speed settings.

It is another objective of the instant invention to provide an indexing device for generating smooth controlled rotary motion with momentary stationary periods of the driving mechanism between each cycle of movement to accommodate control functions.

It is another object of the instant invention to provide an improved clutch mechanism whereby precise positioning of the clutch mechanism can be accomplished efficiently.

It is another object of the instant invention to provide an improved clutch mechanism which includes a positive engagement mechanism to ensure a precise cooperation and alignment between drive and indexer.

It is another object of the instant invention to provide an improved clutch mechanism which includes positive engagement clutch disks selected to provide a high strength precise coupling between drive and output.

It is another object of the instant invention to provide an improved clutch mechanism which includes forced clutch plate movement to ensure precise coupling and decoupling between drive and output.

It is another object of the invention to provide an indexing device using high precision, low resistance components.

It is also an object of the instant invention to provide an indexing device for generating balanced controlled rotary indexing motion over a wide range of speed settings.

It is also an object of the instant invention to provide an indexing device for generating balanced controlled rotary indexing motion using an advanced low noise design.

It is also an object of the instant invention to provide an indexing device which includes periods of slow movement and no movement of internal elements to facilitate precise control of the system.

It is an object of the instant invention to provide an indexing device of compact configuration and universally adaptability for practical inclusion in equipment requiring controlled rotary motion.

It is an object of the instant invention to provide an indexing device whereby increases or decreases in the inertial load driven by the indexer does not affect the output in a significant manner.

It is an object of the instant invention to effect any combination of the foregoing objectives.

SUMMARY OF A PREFERRED EMBODIMENT

Hereinafter described is an improved indexing device for generating a smooth and controlled rotary motion. Input rotation is derived from a constant speed electric motor. Double rotary cam channel disks carrying roller members coupled to corresponding slide guides arranged in orientation parallel to the plane of rotation of the cam channel disks are provided. Each slide guide is formed within a trolley movable in a direction transverse to the axis of the slide guides. A linear gear rack is mounted on each trolley in parallel to its sliding motion. The gear racks on the trolleys are opposingly configured across a rotary gear member and are respectively engaged in corresponding positions. The rotary gear member is coupled to the output of the indexing device for measured controlled rotary motion through an automatic clutch. The clutch functions of the present invention are accomplished through a novel automatic clutch arrangement. The automatic clutch is selectively engaged through the interaction between the cam channel disks and a cam follower. The cam follower structure is adapted to precisely and definitely control the clutch of the present invention automatically at appropriate times in the drive cycle. In this manner, the rotary motion of the cranks rotatably driven by a motor at a constant speed is transformed into a linear reciprocating motion of the gear racks (with distinct periods of acceleration, constant speed, and deceleration) which, in turn, is transformed into a smooth, controlled rotary motion through cooperation with the rotary gear member.

The rotary motion generated is especially smooth in that a first acceleration period of significance is effected at the beginning of the indexed rotary motion to reach a constant driving speed, and a second deceleration period of significance is effected at the end of such indexed rotary motion to come to a halt from the driving speed. This characteristic derives from the novel structure of the instant invention in which rotating cranks are slidably coupled to trolleys arranged parallel to the plane of rotating motion of the cranks. The sinusoidal character of motion of the trolleys produces a unique soft start and stop characteristic to provide smooth rotary motion. This motion is further characterized in that twice within each cycle of the device the motion of the trolleys comes to a complete stop permitting a unique opportunity for enhanced control features.

The invention also includes positive coupling features derived from a novel clutch arrangement. The clutch of the present invention is entirely self contained within the indexer assembly itself and requires no operator or external control. The clutch function is accomplished automatically when appropriate during the indexer cycle. During stationary periods, the output of the indexer is locked preventing movement of the indexer and providing unique stability to the device.

The automatic control features of the clutch of the present invention are provided through the interaction of the cam channel disks and a cam follower. The cam follower structure forces respective elements of the clutch into and out of engagement at appropriate times. No other forces are required to create or break a connection between the rotary input to the indexer and the output. Further, because of the compact nature of the present invention and the self lubricating abilities of the present invention, the indexer set forth herein is uniquely suited to accommodate a wide variety of applications easily and efficiently, and with a long duty cycle.

DETAILED DESCRIPTION

Figure 1:
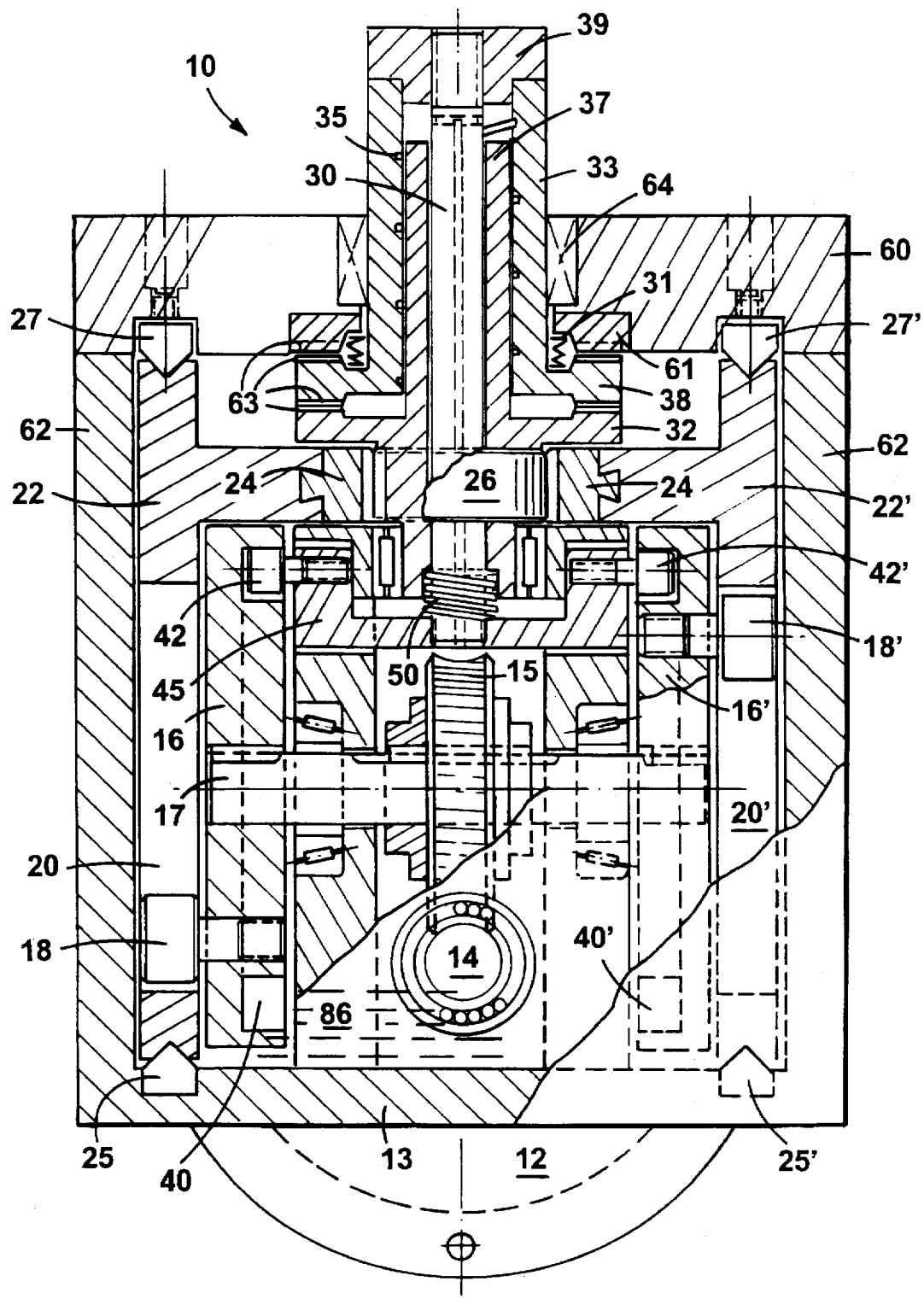
FIG. 1 is a front partial cutaway view showing several principal elements of the invention showing constituent parts.

Referring now to the drawings wherein like numerals indicate like parts, in FIG. 1 the numeral 10 generally indicates an indexing device. The device includes a motor 12 coupled to a worm gear 14 which drives circular gear 15. Circular gear 15 is integrally constructed around cam disk axle 17. Cam disk axle 17 carries cam channel disks 16 and 16' which are rotatably driven through cooperation of circular gear 15 and worm gear 14. At the opposite edges of each of cam channel disks 16 and 16' is disposed circular roller members 18 and 18' respectively.

The motor 12 and worm gear 14 are mounted centrally of a frame support plate 13. The support plate 13 extends the length of the indexing device and through four side plates 62 of the frame where they are attached and held rigid. Support plate 13 together with four side plates 62 and upper ground plate 60 form a closed structure. A continuous oil bath 86 is also provided to promote longevity of the device and ensure efficient operation.

The rotary cam channel disks 16 and 16' are in 180 degrees fixed offset from each other, fixed to opposing ends of cam disk axle 17. They rotate in unison in a bicycle pedal fashion. Roller members 18 and 18' are respectively received in slide guides 20 and 20', each having their longitudinal axes disposed parallel to the plane of rotary motion of the cam channel disks 16 and 16'. Slide guides 20 and 20 ' are respectively received within trolleys 22 and 22'.

Figure 2:
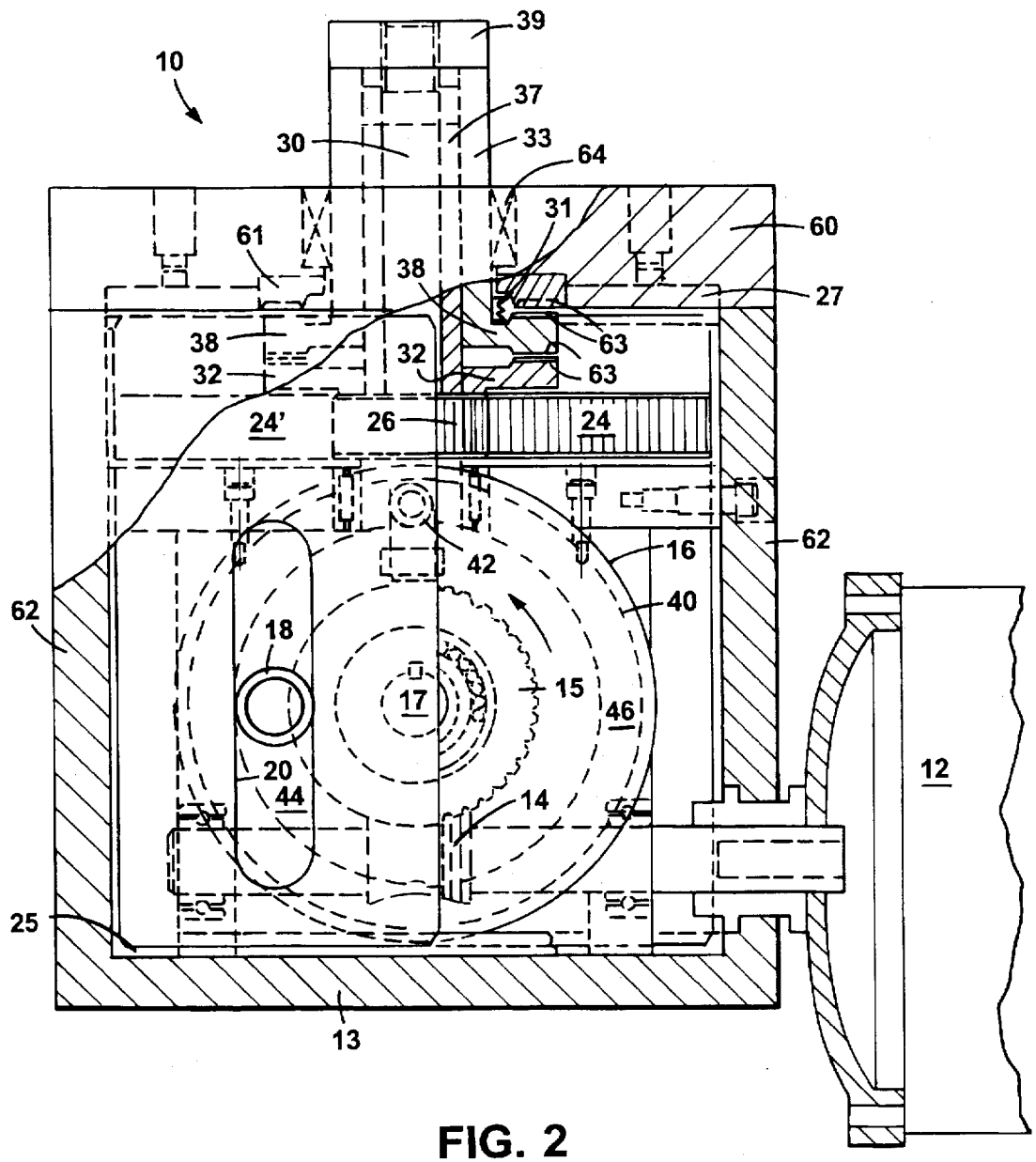
FIG. 2 is a side partial cutaway view of the present invention showing constituent parts.

With reference to FIGS. 1 and 2, each of the trolleys 22 and 22' are movable along two tracks, a lower track 25 and an upper track 27 which are disposed parallel to the plane of rotation of said cam channel disks 16 and 16'. Tracks 25, 27 are provided with a peak beveled surface. Concomitantly, trolleys 22 and 22' are provided with a "v" bevel surface to receive the peak bevel of trolley 22 and 22' tracks 25, 27. The cooperation between wheels and tracks 25, 27 in this manner provides indexer 10 with unique stability and precise ranges of movement. Tracks 25, 27 are fixedly disposed at a distance greater than the shortest distance between the two "v" bevels provided in the trolleys 22 and 22', forcing the peak bevel of tracks 25, 27 into the "v" bevel of trolleys 22 and 22'. Once assembled, no lateral movement of the trolleys is permitted. This interaction of trolleys and tracks provides an uncommonly stable platform upon which the rotary motion of the output of the indexer is generated.

Figure 3:
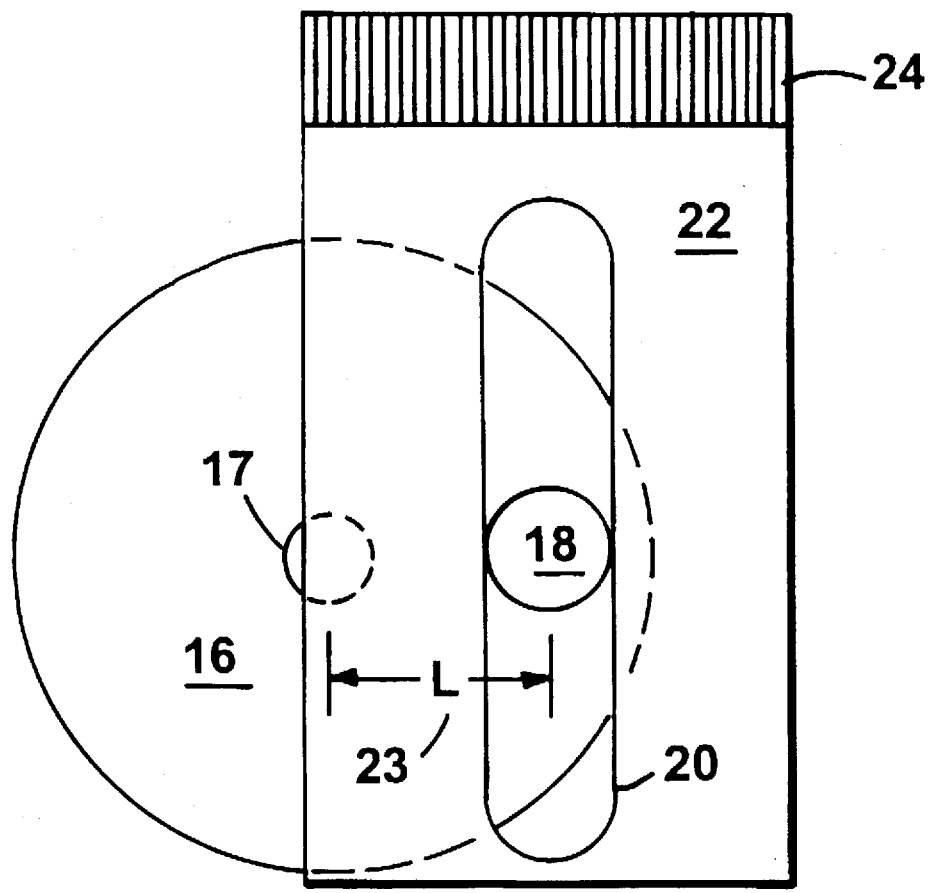
FIG. 3 is a front view of the trolley structures of the present invention showing a slider member engaged therein.

As may be seen in FIGS. 1–3, linear gear racks 24 and 24' are fixedly mounted on the upper surface of each trolley parallel to the axis of trolley motion and are moved therewith. A rotary gear member 26 is disposed between the linear gear racks 24 and 24' and in cooperative engagement therewith as illustrated in FIG. 1. The cooperative engagement is such that the linear gear racks 24 and 24' are symmetrically disposed on opposing sides of rotary gear 26 with respect to a plane transverse to the linear gear racks and through the axis of the rotary gear member. Linear gear racks 24 and 24' are disposed against rotary gear member 26 under pressure to ensure proper mating of rotary gear 26 and linear gear racks 24 and 24'. This arrangement enables rotary gear member 26 to be positively driven by joint motion of linear gear racks 24 and 24'.

Gear 26 rotates freely about a central vertical shaft 30. Fixedly coupled to gear 26 is a first clutch plate known herein as drive disk 32. Drive disk 32 is fixed to gear 26 and rotates in unison about shaft 30 with gear 26 with bearings and bushings as shown in FIG. 1. Drive disk 32 is further integrally connected to sleeve 37 which surrounds shaft 30. No rotation is directly transferred from either gear 26 or drive disk 32 to vertical shaft 30. Drive disk 32 is provided with positive tooth engagement structures 63 on the upper surface thereof. Opposite drive disk 32 is disposed a second clutch plate known herein as clutch disk 38 which is provided with positive tooth engagement structures 63 on the lower surface thereof. Positive engagement teeth 63 permit a positive and precise interface between drive disk 32 and clutch disk 38. During the drive phase of operation, drive disk 32 is operably coupled with clutch disk 38. Clutch disk 38 rotates freely about vertical shaft 30 and freely slides axially along vertical shaft 30.

Vertical shaft 30 is contained within drive sleeve 37 and is freely rotatable within drive sleeve 37. Drive sleeve 37 is integrally formed with drive disk 32. In addition, vertical shaft 30 is free to slide axially within drive sleeve 37. Surrounding drive sleeve 37 is clutch sleeve 33. Clutch sleeve 33 is integrally attached to clutch disk 38. The output of the indexer is taken from clutch sleeve 33. Between drive sleeve 37 and clutch sleeve 33 there is provided rifling 35 which acts to conduct oil from oil bath 86 into the spaces between clutch sleeve 33 and drive sleeve 37.

Disposed above upper clutch disk 38 is a third clutch plate known herein as ground disk 61. Ground disk 61 is fixedly mounted to upper ground plate 60 and is restrained from movement of any character to form an anchor for clutch disk 38 when engaged. Clutch disk 38 is also provided with further engagement teeth 63 on its upper surface. Engagement teeth 63 are fixedly attached to the upper surface of upper clutch disk 38 and are adapted to engage further engagement teeth 63 disposed on the under side of ground disk 61. A circular wave spring 31 encircles the lower section of the clutch sleeve 33. Opposite ends of spring 31 bear against clutch disk 38 and ground disk 61, biasing these components apart.

At the upper end of clutch sleeve 33, there is provided a sleeve cap 39. Sleeve cap 39 is fixed to clutch sleeve 33 in a threaded engagement. The interior underside of cap 39 bears against and rests upon sleeve 33. Cap 39 is threaded to shaft 30 and is biased against the upper end of shaft 30 through gravity and through the force provided by circular wave spring 31.

In operation, the indexer and clutch of the present invention provide unique advantages not foreseen in the prior art. Motor 12 provides constant rotational movement to worm gear 14. Worm gear 14 in turn provides rotational power to cam disk axle 17. As cam axle 17 rotates, cam channel disks 16 and 16' rotate through each cycle of rotation, roller members 18 and 18' move up and down in slide guides 20 and 20 ' and trolleys 22 and 22' move laterally.

With reference to FIGS. 1–3, the roller member 18 of cam channel disk 16 is configured at the 3 o'clock position while the roller member 18 of cam channel disk 16' is configured at the 9 o'clock position. As motor 12 rotates the cam channel disks through a 180 degree rotation, roller members 18 and 18' slide up and down in slide guides 20 and 20 ' respectively, and thus trolleys 22 and 22' move laterally on opposing sides of the rotary gear member 26. As cam channel disks 16 and 16' rotate, roller member 18 will move to the 9 o'clock position while roller 18' proceeds to the 3 o'clock position. The radius between the center of cam channel disks 16 and the position of roller member 18 shown in FIG. 3 will be called the "slide member radius 23" in describing the present invention. The movement of trolleys 22 and 22' is a function of the cosine of the angle formed by the slide member radius 23 and the longitudinal axis of the vertical shaft 30. Trolleys 22 and 22' move at the same rate in opposite directions with maximum velocity occurring when the slide member radius 23 is parallel to the axis of vertical shaft 30, and at zero velocity when that radius is perpendicular to the axis of the vertical shaft 30. At each occurrence of zero velocity, trolleys 22 and 22' reverse their direction of travel. Accordingly, for each 360 degree rotation of cam disk axle 17, trolley members 22 and 22' complete one cycle of linear movement, travelling once in each linear direction.

The extent of movement of trolleys 22 and 22' is determined by the length of the slide member radius 23, which is the distance between the center of disks 16 and 16' and the radial position of roller member 18 and 18'. Assuming the trolleys centered upon the axis of rotation of the cam disk axle 17 as the zero position, the equation describing the position of the trolleys is the length of the slide member radius 23 multiplied by the sine of the crank angle with respect to the vertical. In describing this invention, each complete extent of rotation in one direction shall be referred to generically as a "measure" there being two measures of rotation of gear 26, one in each direction, for each complete rotation of circular gear 15.

As cam channel disks 16 and 16' rotate, roller members 18 and 18' move trolleys 22 and 22' along their supporting tracks because of the reception of 18 and 18' in guides 20 and 20 ' as may be seen in FIG. 3. Movement of trolleys 22 and 22' is restricted to lateral motion only by the engagement of the trolleys 22 and tracks 25 and 27. The trolleys carry respective racks 24 and 24'. As the racks move back and forth, they rotate gear 26 which is coupled to drive disk 32.

As will be discussed in detail below, the rotation of drive disk 32 in a first direction will be used to produce rotation in clutch sleeve 33 and one measure of rotation in this direction will be referred to as the "drive cycle." The rotation of drive disk 32 in the opposite direction will not be used to produce rotation in clutch sleeve 33 and one measure of rotation in this direction will be referred to as the "return cycle."

Rotation of drive disk 32 is coupled to rotation of gear 26. With each complete cycle of crank axle 17, drive disk 32 rotates one measure in the drive cycle direction, and one measure in the return cycle direction. The interaction of drive disk 32, clutch disk 38 and ground disk 61 is used to provide rotational output of the present invention during the drive cycle and fixes the output during the return cycle. The interaction between drive disk 32, clutch disk 38, and ground disk 61 is a positive lock which does not permit slippage or independent movement of the disks.

Figure 4:
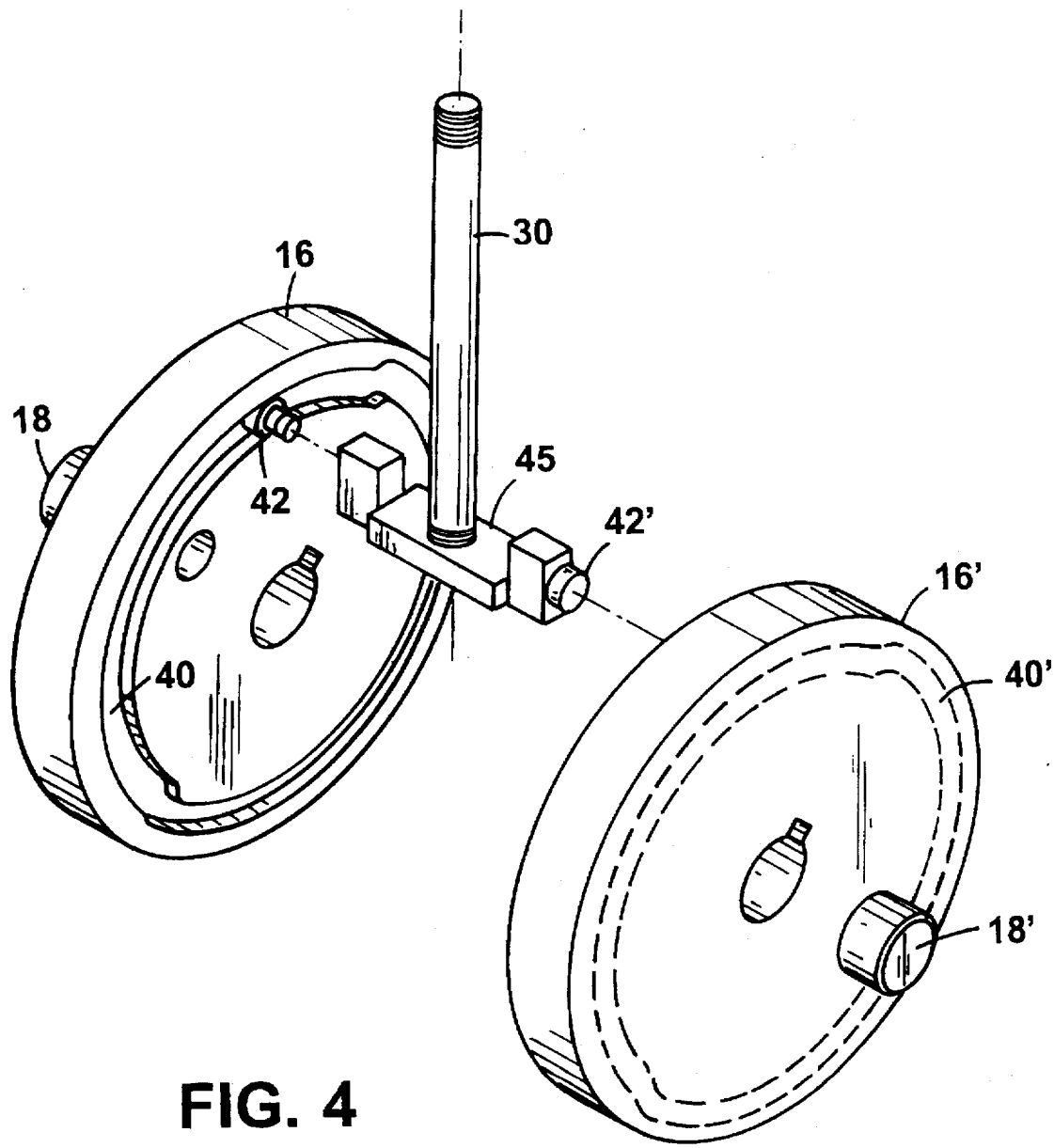
FIG. 4 is a perspective view of the cam channel disks and cam follower structures of the present invention.
Figure 6:
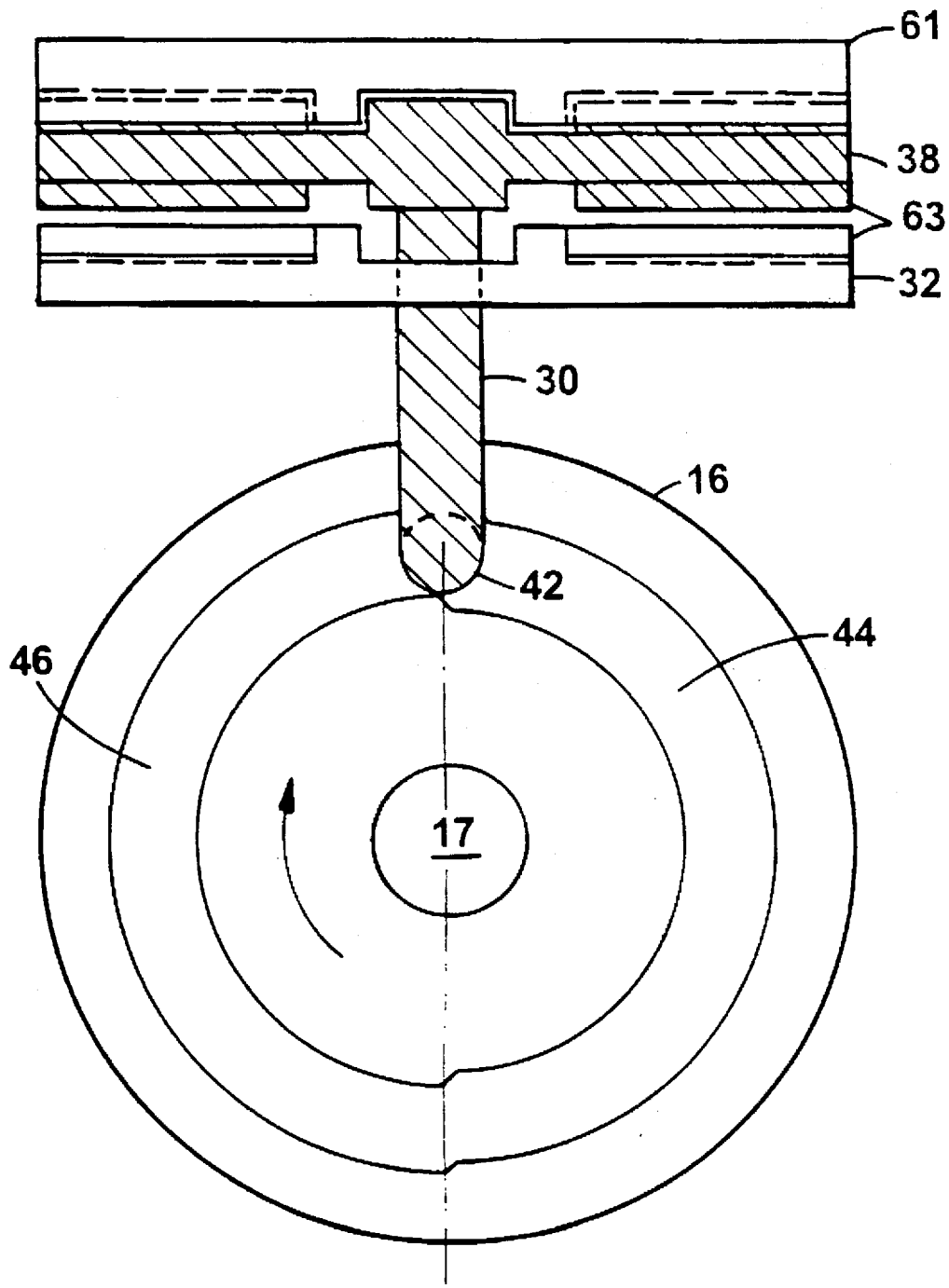
FIG. 6 is a side view of the cam channel disks of the present invention showing the cam channel structures and clutch plates of the present invention.

The movement and control of clutch disk 38 is automatically controlled by the cam structures of cam channel disks 16 and 16'. As may be seen in FIGS. 4 and 6, cam channel disks 16 and 16' are provided with cam channels 40 and 40'. Cam channels 40 and 40' are used to automatically control clutch disk 38. Within cam channels 40 and 40' are received cam followers 42 and 42'. Cam channels 40 and 40' consist of two distinct portions, an inner track 44 which is disposed at a radius approximately twelve centimeters and an outer track 46 disposed at a radius of approximately fourteen centimeters. The inner track corresponds to the drive cycle while the outer track corresponds to the return cycle.

Cam followers 42 and 42' are disposed on opposite ends of transverse bar 45. Transverse bar 45 supports the lower end of vertical shaft 30, and is effectively loaded by centrally located spring 50. Referring particularly to FIG. 5, in operation, as cam channel disks 16 and 16' rotate, cam followers 42 and 42' slide along cam channels 40 and 40'. During the drive cycle, cam followers 42 and 42' are disposed within inner track 44 which lowers transverse bar 45 and vertical shaft 30 with it as may be seen in FIG. 5a. During the return cycle, cam followers 42 and 42' are disposed within outer track 46 which raises transverse bar 45 and vertical shaft 30 as may be seen in FIG. 5c. This controlled movement of shaft 30 is used to manipulate clutch disk 38 as will be explained below.

Figure 5A:
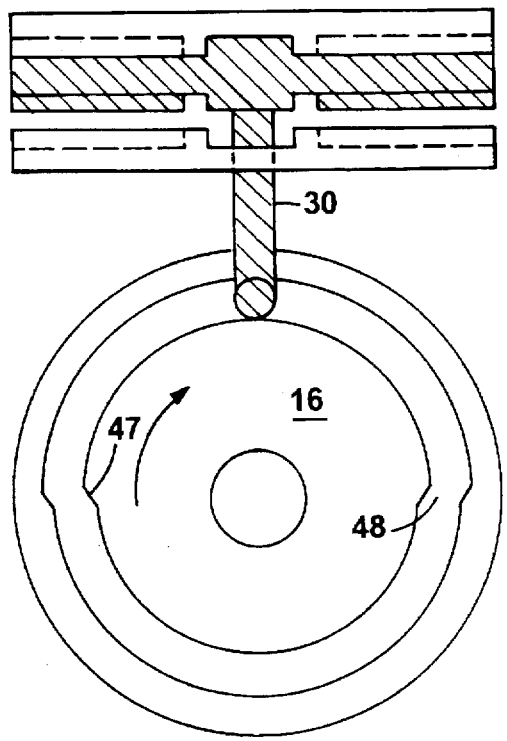
FIGS. 5a–5e are a series of side views of the cam channel disks of the present invention showing the automatic engagement and disengagement of the clutch of the present invention.
Figure 5B:
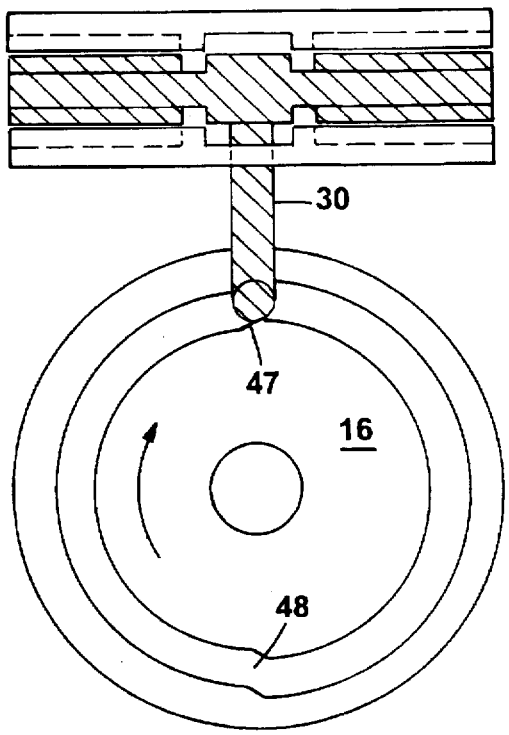
Figure 5C:
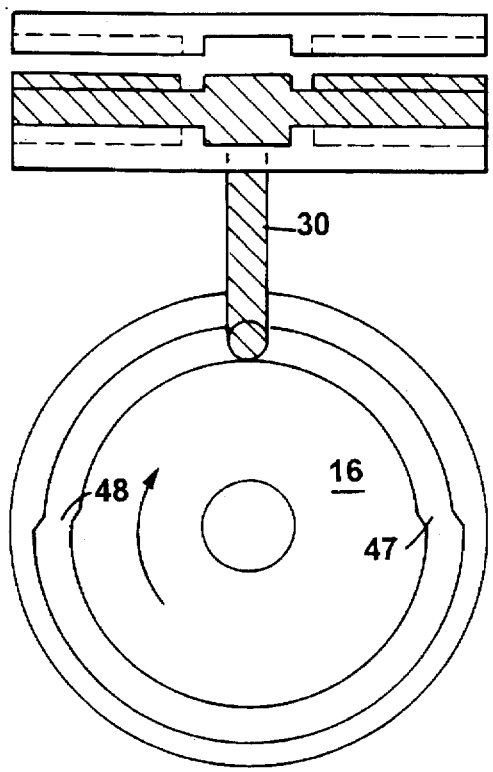
Figure 5D:
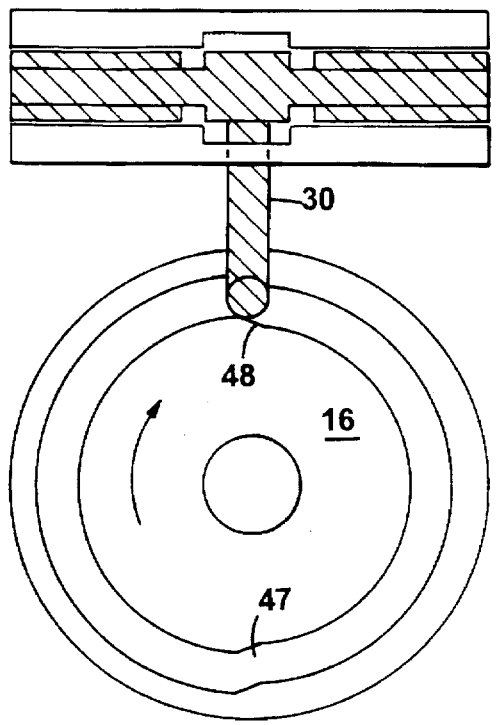

When cam followers 42 and 42' are disposed within the outer track (i.e. during the return cycle), shaft 30 is disposed in its upper position as shown in FIG. 5a. Upon reaching the end of outer track 46 as shown in FIG. 5d, cam followers 42 encounter a first transition 47 and are forced into the inner track, lowering transverse bar 45 as shown in FIG. 5b. This lowers shaft 30 thereby disengaging clutch disk 38 from ground disk 61. As cam followers 42 complete transition 47 and reach inner track 44, shaft 30, sleeve cap 39, clutch sleeve 33, and clutch disk 38 are moved downward. Clutch disk 38 comes into positive engagement with drive disk 32 and rotational output is transferred from drive disk 32 to the output of the indexer at clutch sleeve 33. Thus, the device automatically begins the drive cycle as shown in FIG. 5c. This motion continues as long as cam followers 42 and 42' remain within inner track 44 of cam channel disks 16 and 16', which is approximately one-hundred and eighty degrees of rotation of the cam axle 17 as represented in FIG. 5c.

Upon reaching the end of inner track 44, cam followers 42 and 42' encounter a second transition 48 and are forced into the outer track 46 of cam channel disks 16 and 16' and the return cycle begins as shown in FIG. 5d. Transverse bar 45 is moved upward, thereby moving vertical shaft 30 upward as well. The upper end of vertical shaft 30 forces sleeve cap 39 upward, also moving clutch sleeve 33 and clutch disk 38 upward, compressing circular wave spring 31. As clutch disk 38 moves away from drive disk 32, no further rotational energy is imparted to the clutch disk 38 or to the indexer output through clutch sleeve 33. As will be explained below, the indexer is configured so that transitions between drive and return cycles occur when the output of the indexer is stationary, thereby facilitating the disengagement of the positive tooth clutch 38 from drive disk 32. A one way bearing 64 is provided to prevent any backward drifting of the output of the indexer during the transition period.

Figure 5E:
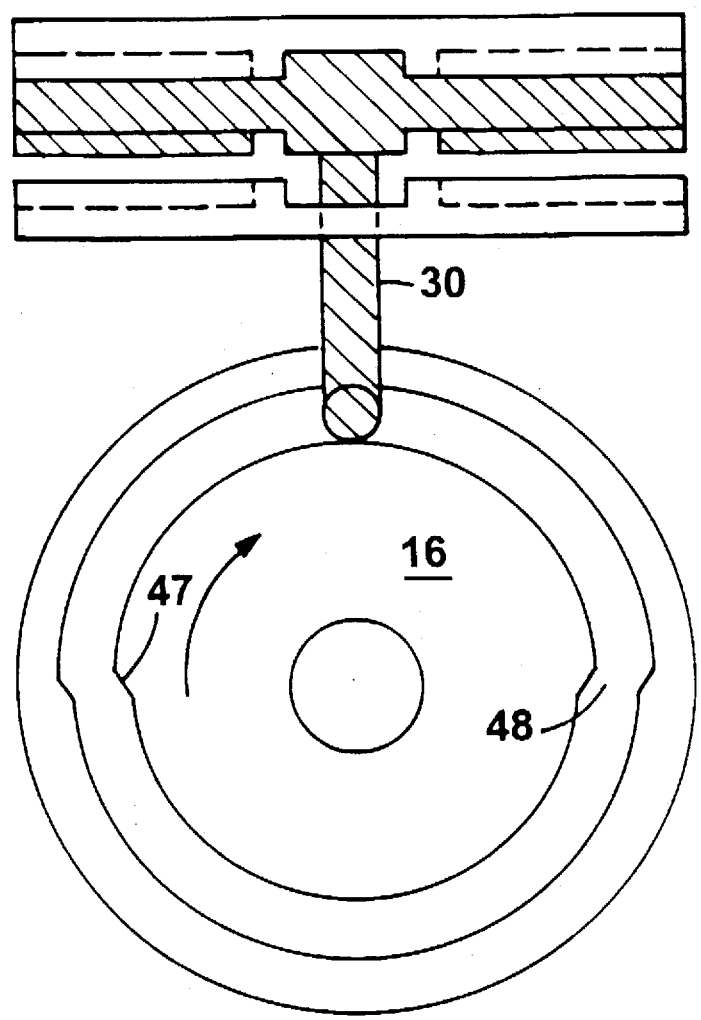

At the end of transition 48, cam followers 42 are drawn into outer channel 46, forcing vertical shaft 30 upward. As a result, clutch disk 38 is compressed against ground disk 61 and the positive engagement teeth 63 provided on both the upper surface of clutch disk 38 and the lower surface of ground disk 61 engage, thereby fixing clutch disk 38 in place and preventing movement of the output of the indexer during the return cycle. The state of the system during the return cycle is shown in FIG. 5e.

Thereafter, upon reaching the end of outer track 46 as shown in FIGS. 5a–b, cam followers 42 again encounter transition 47 and are forced into the inner track, lowering transverse bar 45, disengaging clutch disk 38 from ground disk 61, and repeating the entire process. In this manner, control of the clutch mechanism is carried out completely automatically, no input from the operator is required.

In order to ensure against abrupt changes in the output of the indexer, transitions in clutch 38 are carried out only when the output of the indexer is at rest. This is accomplished by aligning the transitions 47 and 48 exactly ninety degrees out of phase with roller members 18 and 18'. When in operation, trolleys 22 and 22' move as a function of the cosine of the angle between the slide member radius 23 and the vertical. When that angle is ninety degrees (i.e. the roller members are disposed at the nine and three o'clock positions), the velocity of the trolleys is zero and thereby the output velocity is zero. The cam followers 42 and 42' always lie only at the 12 o'clock position. By placing the transitions 47 and 48 ninety degrees out of phase with roller members 18 and 18', the transitions will thus encounter cam followers 42 and 42' only when the output of the indexer is zero.

The present invention provides unique and powerful advantages not available in the prior art. Because of the sinusoidal movement of the trolleys due to their respective coupling to opposing channel disks, the linear gear racks 24 and 24', which are in engagement with the rotary gear 26, cause gear 26 to rotate also in a sinusoidal fashion. As a sinusoid, the rotation of the rotary gear member has a soft start and stop characteristic. The gear action is slow at the start and finish, while smoothly accelerating to peak velocity halfway through the cycle, and slowing smoothly again to a stop at the end of the cycle.

The angle of the slide member radii with respect to the axis of the vertical shaft 30 drives a sinusoidal function which determines the output velocity function of the indexer. The magnitude of the output velocity and the extent of movement in each measure are a function of the diameter of cam channel disks 16 and 16' and the diameter of gear 26. The output equation is approximated by the following expression:

$$W_{output} = W_{cam\ axle} L/R_{gear\ 26} \text{Sine} \Theta \qquad (1)$$

Where:

$W_{output}$=the output of the indexer in radians per second $W_{cam\ axle}$=the input rotational velocity of the cam axle in radians per second L=the length of the slide member radius 23 (distance between the roller member 18 and the center of axle 17) in meters.

$R_{gear\ 26}$=radius of gear 26 in meters. $\Theta$=the angle of the slide member radius 23 with respect to the direction of travel of trolleys 22.

By placing roller members 18 and 18' further away from the center of cam channel disks 16 and 16', trolleys 22 move through greater distance with each cycle, moving gear racks 24 through greater distance and rotating gear 26 a proportionally greater distance. By choosing different diameters for gear 26, the extent of perimeter travel of racks 24 translates into different magnitudes of output rotation and numbers of pauses or "stations" in the indexer output for each full rotation of the output. The magnitude of each measure of rotation is determined by the application of the indexer. The relationship between the distance between roller members 18 and the center of cam channel disks 16, gear 26 radius and the number of output stations is given by:

$$N = 2\pi R/2L \qquad (2)$$

where:

N=number of stations desired

R=radius of gear 26 in meters

L=Length of slide member radius 23

By choosing N to be a series of whole numbers, values of slide member radius 23 are generated for each number of stations desired. Typically, indexer units are designed to accommodate one to eight stations. The present invention includes as one of its unique advantages the ability to accommodate a variety of numbers of indexer stations without sacrificing stability and accuracy and without modifying the basic design of the device. Each indexer unit may be provided with cam channel disks 16 and 16' having a plurality of mounting points of roller members 18 and 18' as calculated above to accommodate different numbers of indexer stations. For example, for a nominal gear 26 radius of 15 centimeters, in order to produce an indexer output having four stations, according to equation (2) above, a slide member radius 23 of approximately 11.78 centimeters is chosen. Similarly, for 6 stations, equation (2) indicates a slide member radius of approximately 7.85 centimeters. Alternatively, an output transmission may be used to step the output of the indexer to the desired level.

In the manner described above, the driving motion of the linear gear racks is smooth and soft, as it encompasses a beginning period of acceleration, a zone of constant driving speed, and an ending period of deceleration. Consequently, the rotary gear member driven by the linear gear racks also generates a soft and smooth rotary motion. At the beginning of the drive cycle, the angle of slide member radius 23 with respect to the horizontal begins at zero and acceleration of the work piece is low producing a soft start characteristic. As the drive cycle progresses and the slide member radius angle approaches forty-five degrees, acceleration reaches its maximum. As the slide member radius angle travels through ninety degrees, acceleration decreases to zero and a period of relatively constant velocity output occurs. As the angle of slide member radius 23 with respect to the horizontal goes beyond ninety degrees, a period of deceleration ensues beginning with a slight deceleration progressing through greater deceleration. Finally, as slide member radius angle approach a 180 degree displacement, both velocity and acceleration again return to zero gradually, producing a soft stop characteristic. The extent and magnitude of acceleration generated in the output of the present invention may be described in the following equation derived by taking the first derivative of equation (1) above:

$$A_{output} = W_{cam\ axle} L/R_{gear\ 26} Cosine\Theta \quad (3)$$

Furthermore, no side loading occurs during indexing, since the symmetric output reducer cranks, roller members, slide guides, trolleys, and gear racks share and balance the driving force equally across the vertical axis of the device. This produces considerable stability in the overall device and is an important development. By balancing the load across the central axis of the device, extraneous torque is avoided. In many prior art systems, such torque has been cited as a defect causing vibration and undesirable movement of the device.

The indexing device of the instant invention may be adapted for many uses including the precise alignment of work pieces in automated operations. Because the indexer of the present invention reproduces precise positioning output, the indexer may be advantageously used to position work pieces for automated manufacturing operations. Additionally, the positive locking features of the indexer during rest cycles enable the use of automated manufacturing systems without consideration of the movement of work pieces.

During operation of the indexer, at the end of each drive and return cycle trolleys 22 come to a complete stop briefly as they change direction. This cessation of motion occurs as the sine of the angle of the slide member radius approaches zero. This results in a gradual slowing of the trolleys to a full stop and then a slow acceleration in the opposite direction. This period of slow motion, stop, and slow motion affords a unique opportunity to integrate control of the indexer and its output system such as a manufacturing process. Well known control elements such as optical switches, induction proximity sensors, interference sensors, and other electronic control transducers may be advantageously used to control the present invention. In automated systems, the ability to accurately sense the position of work in progress is essential. Because of the slow, stop, slow characteristic of the present invention, these sensors may be used to accurately indicate to a central digital control unit that the indexer has completed its drive cycle and is in its locked position and further may indicate that the indexer is again about to advance to the next station. Also advantageously, this slow, stop, slow characteristic occurs when loads on driving motor 12 is at a minimum, thereby facilitating motor control during periods of least current flow.

The operation of the clutch of the present invention is highly advantageous in that engagement and disengagement of the drive and output mechanisms are direct, definite events dictated by the interaction of cam followers 42 and 42' within cam channels 40 and 40'. The control of the clutch elements is accomplished automatically through the placement of roller elements 18 and 18' and the position of inner and outer cam channel tracks 44 and 46. The transitions between inner cam track 44 and outer cam channel 46 dictate the moments of transition for clutch disk 38.

The ease and efficiency of the present invention producing accurate indexing with a soft start and stop characteristic is a substantial advance in the field of work positioning indexers. Precise, consistently reproducible results are achievable with a minimum of preparation time. The positive locking features of the improved clutch design provides absolute stability during rest cycle periods to enable automated operations to proceed without reference to work piece movement. The automatic features of the clutch significantly reduce the interior control and operator input necessary to operate the device. These features also facilitate integration of the indexer into broader mechanical systems.

Summary of Major Advantages

The indexing assembly of the instant invention provides a uniquely smooth rotary indexing motion. The indexing motion carries with it a soft start and stop characteristic not present in prior art units of this kind. The soft start and stop characteristic creates a robotic quality to the output of the indexer. In addition, the rotary motion generated via a preferred embodiment of the instant invention is well balanced through a stable structure configured symmetrically about a rotary gear member. The positive engagement wheel and track structures provide a uniquely stable foundation for the device. Furthermore, the structure of the instant indexing device is compact and easily adaptable for configuration in a wide range of host equipment requiring indexed rotary motion. The device has a compact structure, is relatively inexpensive, and can be incorporated easily into the drive section of indexer assemblies without altering unit design. The instant indexing device includes a unique clutch mechanism which minimizes interior control and operator input. The clutch is automatically actuated through the normal operating cycle of the indexer. A unique and advantageous system of cam channels and followers provides this automatic clutch control. The present invention also provides the capability to support advanced control mechanisms because of its unique soft stop and start characteristics. A significant advantage of the present invention also lies in its unitary and compact design. For these reasons, the device according to the disclosed embodiments of the instant invention has more utility and potential applications, and it is more practical and efficient in usage.

In describing the invention, reference has been made to preferred embodiments. Those skilled in the art, however, and familiar with the disclosure of the subject invention, may recognize additions, deletions, substitutions, modifications, and/or other changes which will fall within the purview of the invention as defined in the following claims.

I claim:

1. An indexing device for generating smooth, controlled rotary motion comprising:

a motor having a rotational output;

a first cam channel disk coupled to said motor output and rotatably driven thereby in a first plane of rotary motion;

first means for inducing linear motion of a first linear gear rack responsive to rotation of said first channel disk in said first plane, wherein said motion of said first linear gear rack is smooth and includes distinctive periods of acceleration, generally constant driving speed, and deceleration;

a second channel disk coupled to said rotational output and rotatably driven thereby in a second plane of rotary motion offset from said first plane of rotary motion;

second means for inducing linear motion of a second linear gear rack responsive to rotation of a second crank in said second plane, wherein said motion of said second linear gear rack is smooth and includes distinctive periods of acceleration, generally constant driving speed, and deceleration;

a rotary gear member in cooperative engagement with both of said first linear gear rack and said second linear rack such that it is rotatively driven by linear motion of said first and second linear gear racks with one of said first or second linear gear racks disposed on one side of said rotary gear member, and the other of said first or second linear gear racks disposed on the opposite side of said rotary gear member;

clutch means coupled to said rotary gear member for transmitting an output of an indexer to an output sleeve, wherein said output sleeve is coupled to said rotary gear member for transmitting the output of said indexer to a work piece; and rotating motion of said output sleeve also manifests said distinctive periods of acceleration, generally constant driving speed, and deceleration.

2. The indexing device of claim 1 wherein said first means for inducing linear motion of a first linear gear rack comprises:

a first cam channel disk having a first roller member fixed to an edge of said disk;

a first trolley having means for moving said first trolley in a direction parallel to said first plane;

said first trolley having a first groove extending in a first direction orthogonal to the linear motion of said first linear gear rack and adapted to receive said first roller member;

wherein rotation of said first cam channel disk results in sliding movement of said first slide means along said first groove.

3. The indexing device of claim 2 wherein said second means for inducing linear motion of a second linear gear rack comprises:

a second cam channel disk having a second roller member fixed to an edge of said disk;

a second trolley having means for moving said second trolley in a direction parallel to said second plane;

said second trolley having a second groove extending in a first linear motion orthogonal to the direction of said second linear gear rack and adapted to receive said second roller member;

wherein rotation of said second cam channel disk results in sliding movement of said second slide means along said second groove.

4. The indexing device of claim 1 wherein said clutch means comprises:

an output sleeve shaft;

a first clutch plate having a plurality of positive engagement teeth disposed thereon;

a second clutch plate fixedly connected to said output sleeve and having a plurality of positive engagement teeth disposed on an upper and lower surface thereof;

a third clutch plate fixedly connected to a stationary surface having a plurality of positive engagement teeth disposed thereon;

drive sleeve means fixedly coupling said rotary gear member to said first clutch plate; and means for selectively driving said second clutch plate between engagement with said first clutch plate and said third clutch plate.

5. The indexing device of claim 4 wherein said means for selectively driving said second clutch plate further comprises:

an inner cam follower channel disposed on at least one of said first and second cam channel disks;

an outer cam follower channel disposed on at least one of said first and second cam channel disks;

at least one cam follower disposed within said inner cam follower channel or said outer cam follower channel;

means for operably connecting said cam follower to said second clutch disk to selectively engage and disengage said second clutch disk concurrently with the movement of said cam follower between said inner and outer cam channels.

* * * * *